United States Patent
Kashihara et al.

(10) Patent No.: US 7,643,394 B2
(45) Date of Patent: Jan. 5, 2010

(54) OPTICAL DISK, OPTICAL DISK RECORDING METHOD, AND OPTICAL DISK RECORDING APPARATUS

(75) Inventors: Yutaka Kashihara, Chigasaki (JP); Hideki Takahashi, Kashiwa (JP); Akihito Ogawa, Kawasaki (JP); Yutaka Yamanaka, Tokyo (JP); Shigeru Shimonou, Tokyo (JP); Tatsunori Ide, Tokyo (JP); Tsuyoshi Yamamoto, Ota (JP); Katsuki Hattori, Kiryu (JP); Masato Fuma, Ichinomiya (JP)

(73) Assignees: Kabushiki Kaisha Toshiba, Tokyo (JP); NEC Corporation, Tokyo (JP); Sanyo Electric Co., Ltd., Moriguchi-shi (JP)

( * ) Notice: Subject to any disclaimer, the term of this patent is extended or adjusted under 35 U.S.C. 154(b) by 632 days.

(21) Appl. No.: 11/150,234

(22) Filed: Jun. 13, 2005

(65) Prior Publication Data

US 2005/0276191 A1   Dec. 15, 2005

(30) Foreign Application Priority Data

Jun. 14, 2004   (JP)   .............................. 2004-175916

(51) Int. Cl.
  *G11B 7/0045*   (2006.01)
(52) U.S. Cl. ................ 369/53.22; 369/47.36; 369/53.24
(58) Field of Classification Search ............... 369/47.14, 369/47.5, 47.51, 47.53, 53.13, 53.15, 53.17, 369/53.16, 47.36, 53.2
See application file for complete search history.

(56) References Cited

U.S. PATENT DOCUMENTS

| | | |
|---|---|---|
| 5,808,992 A | 9/1998 | Kuroda |
| 5,940,853 A | 8/1999 | Ooi et al. |
| 6,122,646 A | 9/2000 | Igarashi et al. |
| 6,304,534 B1 * | 10/2001 | Ito et al. ................... 369/53.15 |
| 6,628,588 B2 * | 9/2003 | Shimoda ................... 369/47.53 |
| 6,804,797 B2 * | 10/2004 | Ko et al. ........................ 714/42 |
| 2002/0054550 A1 * | 5/2002 | Tomita ....................... 369/47.5 |
| 2002/0081101 A1 | 6/2002 | Taira et al. |
| 2002/0136134 A1 | 9/2002 | Ito et al. |
| 2003/0058766 A1 * | 3/2003 | Murata et al. ............. 369/47.53 |
| 2004/0017749 A1 | 1/2004 | Brooke et al. |
| 2004/0042370 A1 * | 3/2004 | Sugimura et al. ........ 369/59.25 |
| 2004/0114474 A1 | 6/2004 | Park et al. |
| 2004/0160799 A1 | 8/2004 | Park et al. |
| 2004/0165495 A1 | 8/2004 | Park et al. |
| 2004/0179445 A1 * | 9/2004 | Park et al. ................. 369/47.14 |
| 2004/0246851 A1 * | 12/2004 | Hwang et al. ............ 369/53.16 |

(Continued)

FOREIGN PATENT DOCUMENTS

CN   1697050 A   11/2005

(Continued)

*Primary Examiner*—Wayne R Young
*Assistant Examiner*—Thomas D Alunkal
(74) *Attorney, Agent, or Firm*—Oblon, Spivak, McClelland, Maier & Neustadt, L.L.P.

(57) ABSTRACT

In an optical disk recording method of recording data onto a recordable optical disk which includes a data zone where data is recorded and a management data zone where management data indicating the recorded part of the data zone is recorded, an extended management data zone in which the management data is to be recorded is set in the data zone in response to an extension instruction.

8 Claims, 12 Drawing Sheets

U.S. PATENT DOCUMENTS

2005/0018572 A1* 1/2005 Gushima et al. ......... 369/53.15
2005/0265171 A1* 12/2005 Yamamoto et al. ....... 369/47.14

FOREIGN PATENT DOCUMENTS

| | | |
|---|---|---|
| CN | 1734640 A | 2/2006 |
| EP | 1 298 665 A1 | 4/2003 |
| EP | 1 596 378 A2 | 11/2005 |
| EP | 1 600 957 A2 | 11/2005 |
| EP | 1 600 965 A2 | 11/2005 |
| JP | 64-46266 A | 2/1989 |
| JP | 3-4367 | 1/1991 |
| JP | 6-338139 | 12/1994 |
| JP | 7-220400 | 8/1995 |
| JP | 2002-245625 | 8/2002 |
| JP | 2003-331430 | 11/2003 |
| JP | 2004-39185 A | 2/2004 |
| KR | 2001-0085645 | 9/2001 |

* cited by examiner

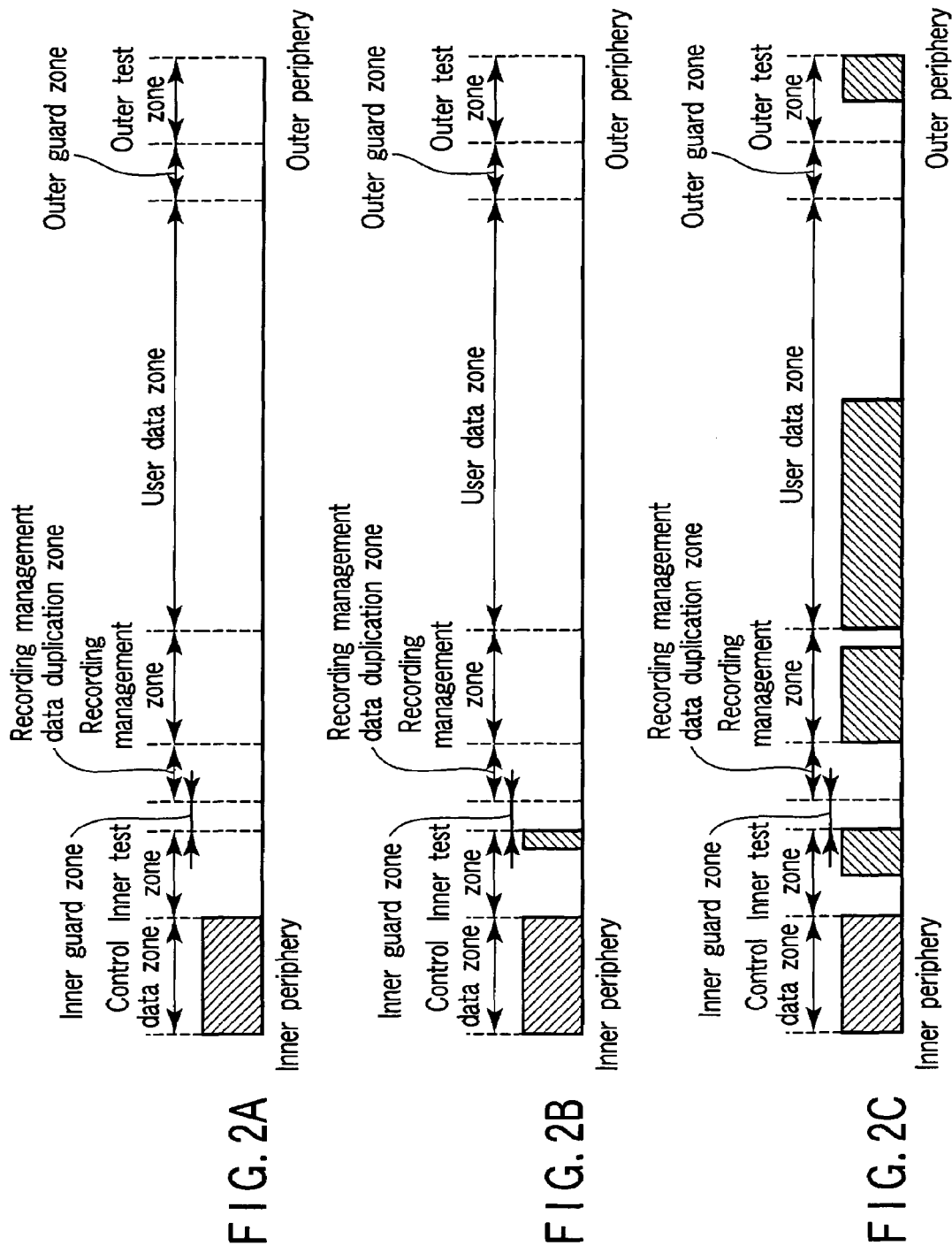

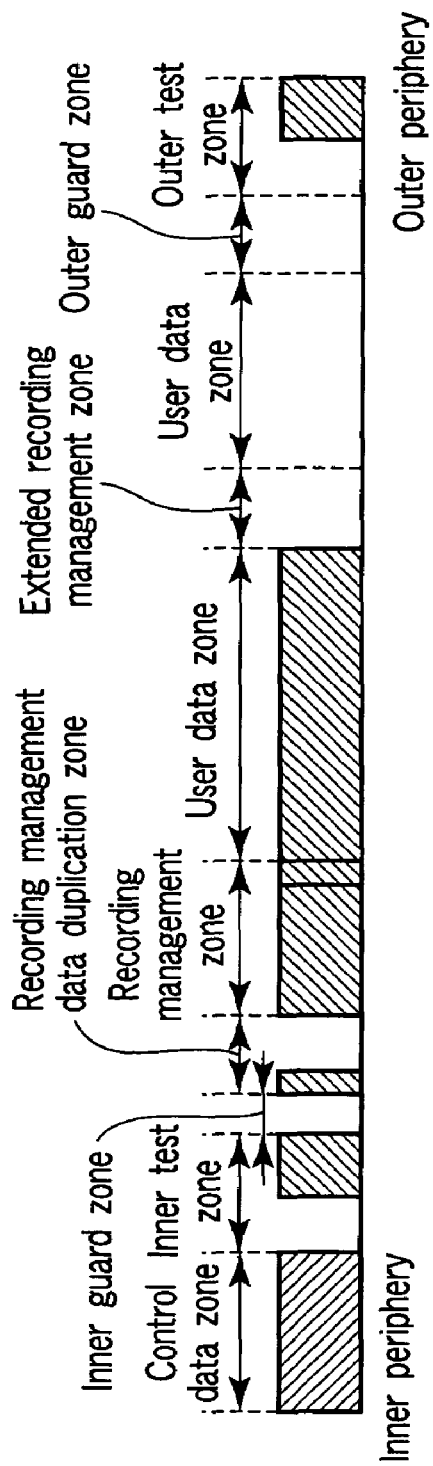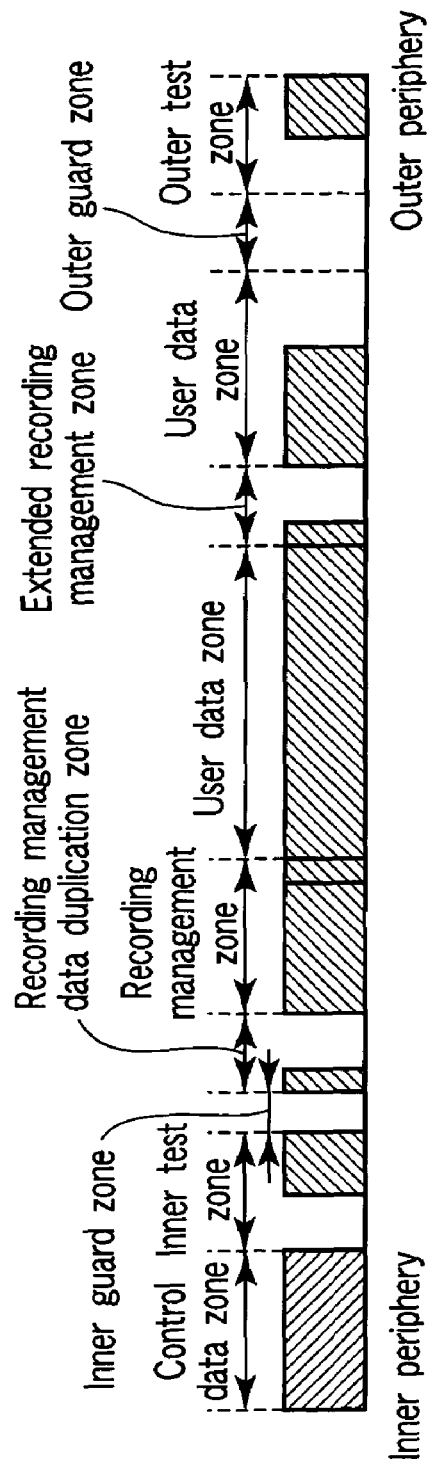
FIG. 2D
FIG. 2E

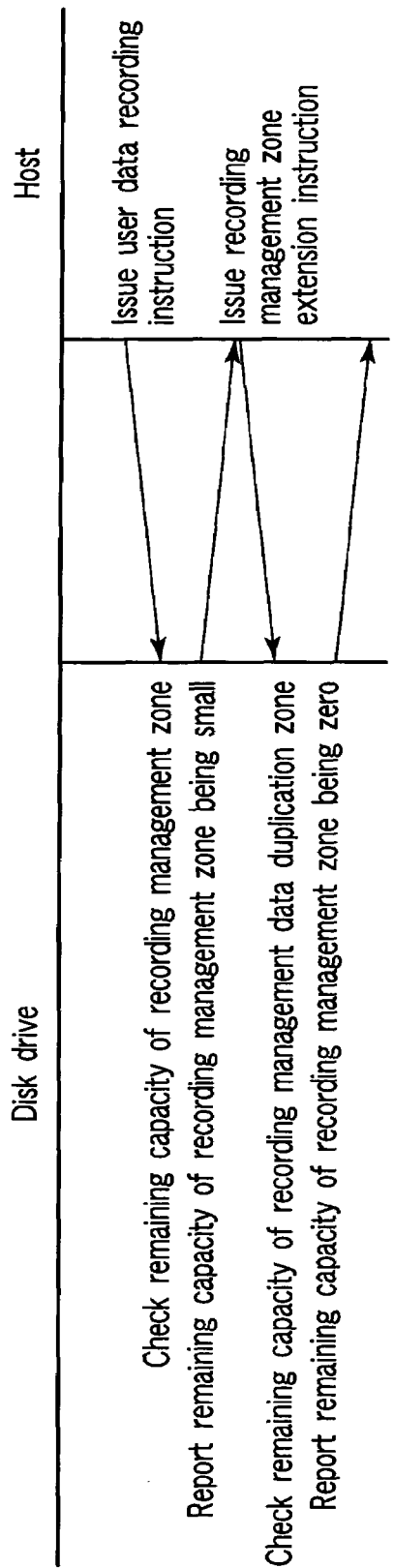
F I G. 5
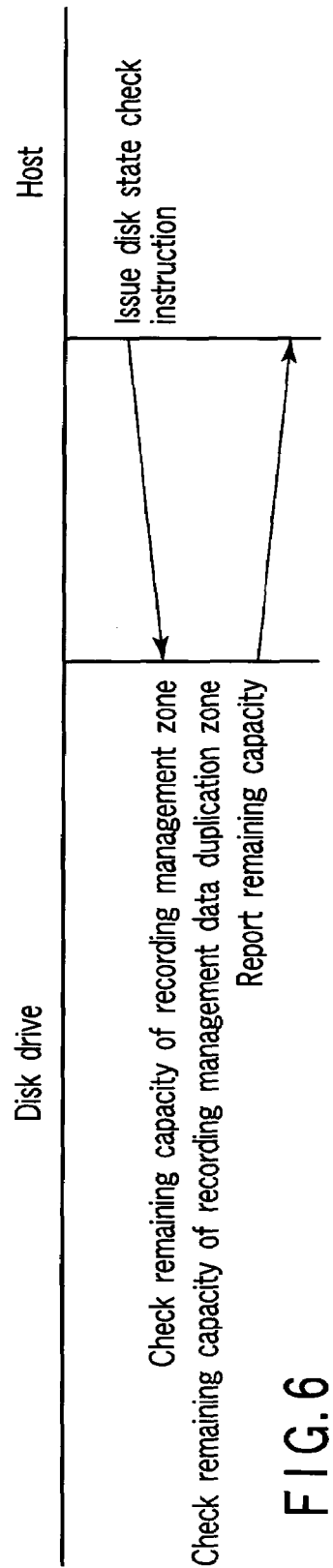
F I G. 6

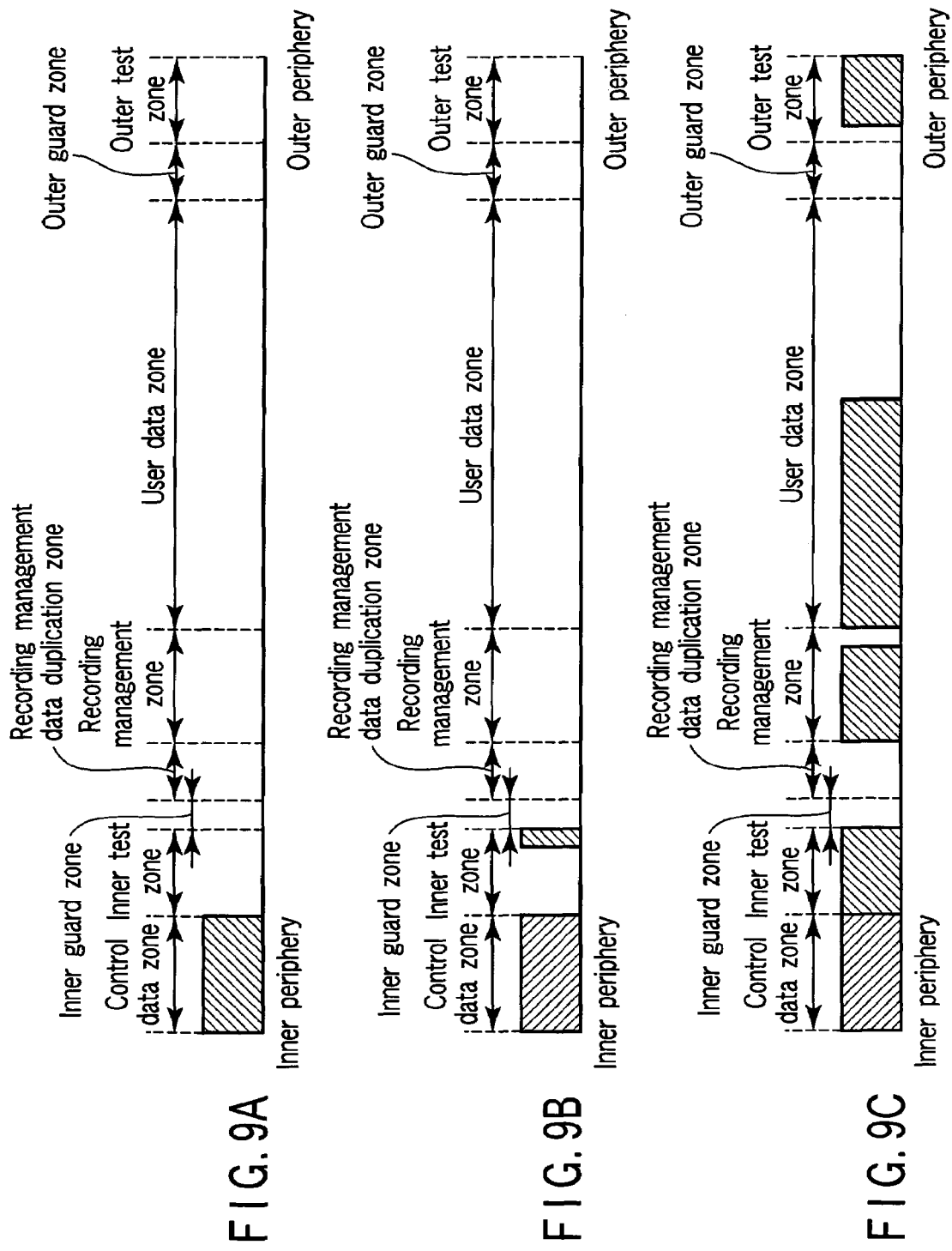

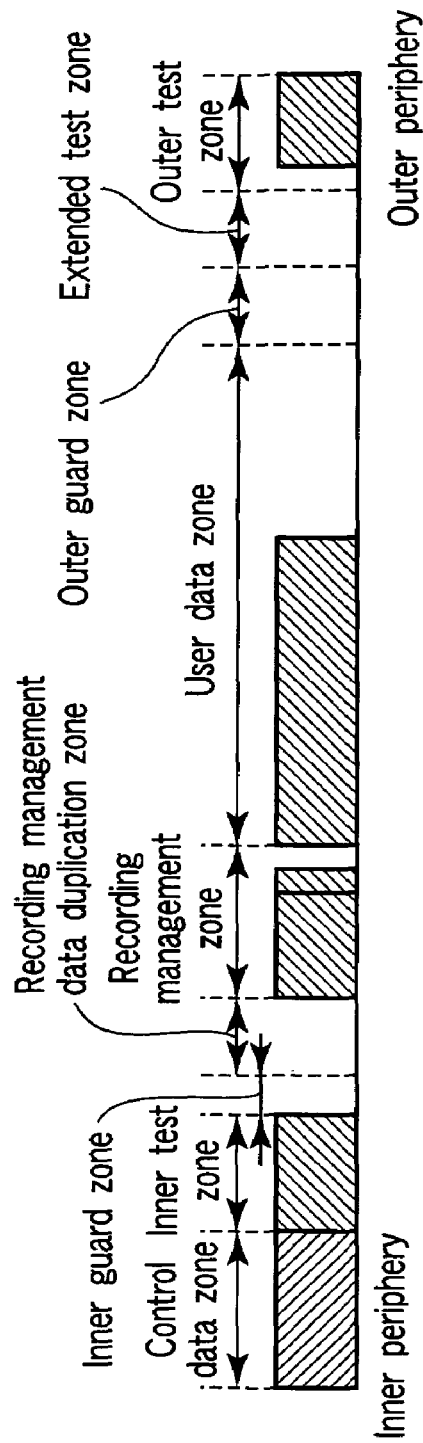
F I G. 9D
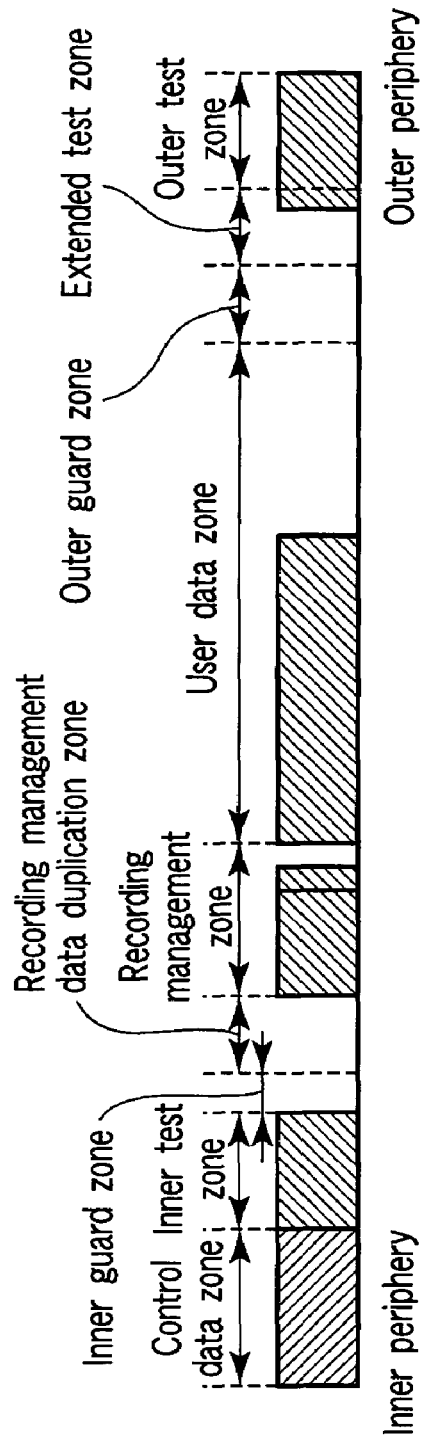
F I G. 9E

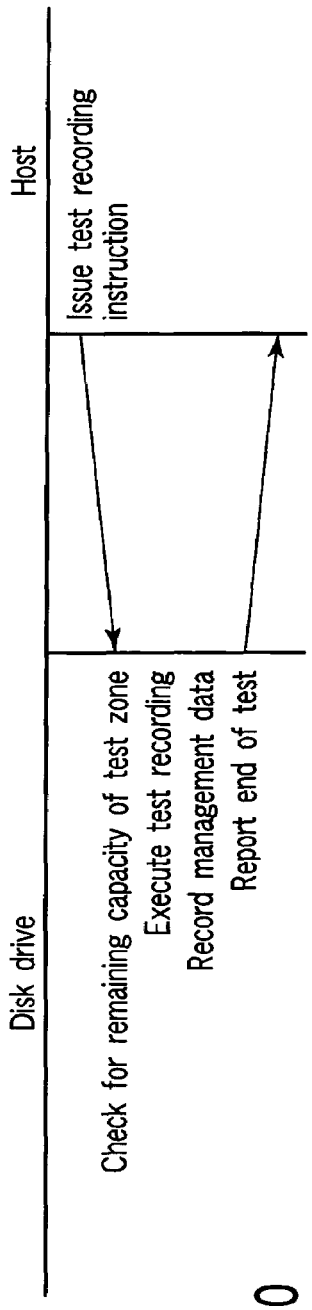
F I G. 10
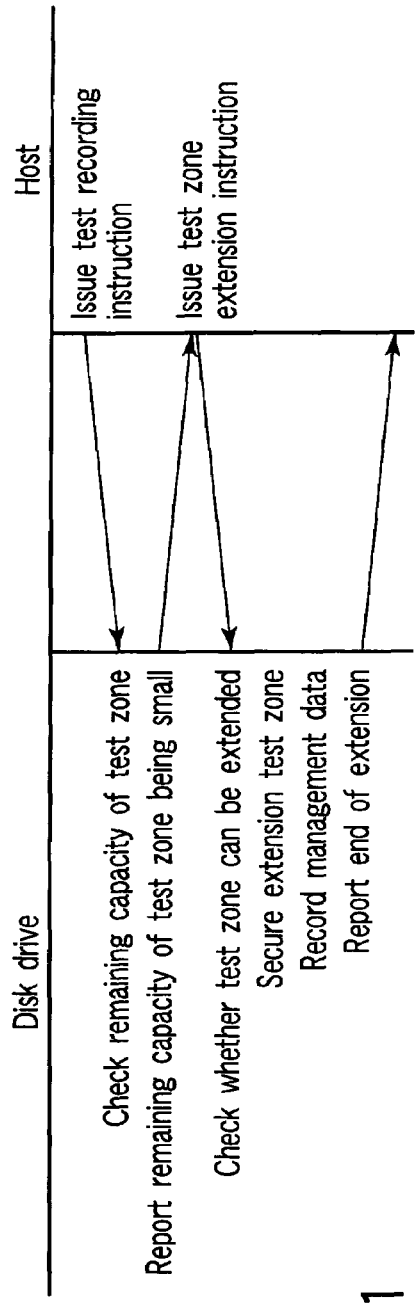
F I G. 11
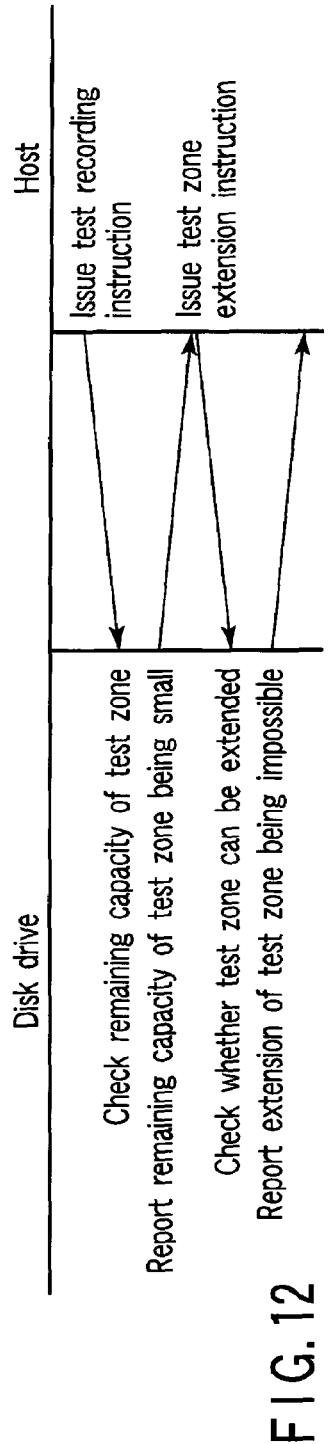
F I G. 12

OPTICAL DISK, OPTICAL DISK RECORDING METHOD, AND OPTICAL DISK RECORDING APPARATUS

CROSS-REFERENCE TO RELATED APPLICATIONS

This application is based upon and claims the benefit of priority from prior Japanese Patent Application No. 2004-175916, filed Jun. 14, 2004, the entire contents of which are incorporated herein by reference.

BACKGROUND OF THE INVENTION

1. Field of the Invention

This invention relates to an optical disk, an optical disk recording method, and an optical disk recording apparatus, and more particularly to a method of recording data onto a recordable optical disk.

2. Description of the Related Art

In recent years, DVDs (Digital Versatile Disks) have been put to practical use in the form of large-capacity optical disks. Recordable DVD-R, rewritable DVD-RW, and DVD-RAM have been standardized as recordable DVDs. Once data is recorded onto a recordable disk, the recorded part cannot be rewritten. A conventional recordable DVD includes a PCA (Power Calibration Area), an RMA (Recording Management Area), and a data recording area DA (Data Area), beginning at the inner periphery in that order. In the data recording area DA, an actual recording process is carried out (refer to, for example, Jpn. Pat. Appln. KOKAI Publication No. 2002-245625, paragraphs [0041] to [0052], and FIG. 1).

The data recording area DA includes a lead-in area where recording parameter data and the like to be read in reproducing the recording data recorded in a data area explained later is recorded, a data area where the recording data is recorded, and a lead-out area where termination data and the like to be read in completing the reproduction of the recording data recorded in the data area. The lead-in area is an area into which recording parameter data and the like are recorded before data is recorded into the data area. The lead-out area is an area into which termination data is recorded before the recording of recording data onto the entire DVD is completed. The capacity of each area is predetermined and cannot be changed.

When data is recorded onto such a DVD (assuming that recording is done, beginning at the inner periphery of the data area), test recording is first performed in the PCA area. The reason is that the parameters (including intensity and pulse width) of the recording waveform in recording data onto the optical disk are adjusted on the basis of the result of the test recording, since even optical disks of the same type differ in characteristic from manufacturer to manufacturer or in recording waveform according to the temperature in the use environment, the laser operating environment, or the like.

Thereafter, management data and user data are recorded into the RMA area and the data area, respectively. The management data includes data indicating which part of the data area has been recorded into (how much of the data area has been recorded into). The management data is updated to the latest one according to how much user data has been recorded. Once data is recorded onto a recordable DVD, the recorded part cannot be rewritten. Therefore, each time the management data is updated, the remaining capacity of the RMA area decreases. Depending on the way the management data is updated, the unrecorded part of the RMA area can run out before all of the data area has been recorded into. When the RMA area has run out of the unrecorded part, the management data cannot be updated. Therefore, the recording of the data area has to be stopped.

As described above, in the DVD apparatus, the recording waveform changes according to temperature change or variation with time. In addition, the optimum recording waveform changes according to the recording position of the disk. To adjust the recording waveform according to these changes, the DVD apparatus performs test recording in the PCA area, thereby adjusting the parameters of the recording waveform. As when the management data is updated, each time test recording is performed, the remaining capacity of the PCA area decreases. Depending on the way test recording is performed, the unrecorded part of the PCA area can run out before all of the data area has been recorded into. When the PCA area has run out of the unrecorded part, the recording operation has to be stopped or the user data and management data have to be recorded without adjusting the recording waveform. From the part where recording has been performed using the unadjusted recording waveform, sufficiently reliable data cannot be reproduced.

To prevent the PMA area or the PCA area from running short, securing a larger capacity of the RMA area or the PCA area beforehand can be considered. In this case, however, the capacity of the data area decreases. As a result, even though the unrecorded part remains sufficiently in the RMA area or the PCA area, the capacity of the data area may run short.

As described above, in the conventional recordable optical disk, because of shortage of the capacity of the RMA area or the PCA area, a part of the user data to be recorded cannot be recorded. Even if the user data can be recorded, it cannot be reproduced with sufficiently high reliability. To overcome this problem, a larger capacity of the RMA area or the PCA area could be secured in advance, causing another problem: the capacity of the user data zone runs short.

BRIEF SUMMARY OF THE INVENTION

The present invention is directed to method and apparatus that substantially obviates one or more of the problems due to limitations and disadvantages of the related art.

An object of the present invention is to provide a recordable optical disk which enables the disk area to be used effectively.

Another object of the present invention is to provide an optical recording method which enables the disk area of a recordable optical disk to be used effectively.

Another object of the present invention is to provide an optical recording apparatus which enables the disk area of a recordable optical disk to be used effectively.

According to an embodiment of the present invention, an optical disk recording method of recording data onto a recordable optical disk which includes a data zone where data is recorded and a management data zone where management data indicating the recorded part of the data zone is recorded, the optical disk recording method sets an extended management data zone in which the management data is to be recorded, in the data zone in response to an extension instruction.

According to another embodiment of the present invention, an optical disk recording method of recording data onto a recordable optical disk which includes a data zone where data is recorded, a test zone where a test recording is performed, and a guard zone provided between the data zone and the test zone, the optical disk recording method comprises:

setting all of or a part of the guard zone or all of the guard zone and a part of the data zone as an extended test zone where the test recording is performed in response to an extension instruction; and setting the extended test zone or a part of the data zone contacting the guard zone as a new guard zone.

According to another embodiment of the present invention, an optical disk recording apparatus which records data onto a recordable optical disk which includes a data zone where data is recorded and a management data zone where management data indicating the recorded part of the data zone is recorded, the optical disk recording apparatus comprises a setting unit which sets an extended management data zone in which the management data is to be recorded, in the data zone in response to an extension instruction.

According to another embodiment of the present invention, an optical disk recording apparatus which records data onto a recordable optical disk which includes a data zone where data is recorded, a test zone where a test recording is performed, and a guard zone provided between the data zone and the test zone, the optical disk recording apparatus comprises:

a first setting unit which sets all of or a part of the guard zone or all of the guard zone and a part of the data zone as an extended test zone where the test recording is performed in response to an extension instruction; and a second setting unit which sets the extended test zone or a part of the data zone contacting the guard zone as a new guard zone.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 2A, 2B, 2C, 2D and 2E are diagrams to help explain a method of recording data onto a recordable optical disk which involves the extension of the management data area according to a first embodiment of the present invention;

FIG. 5 is a diagram to help explain the operation of the optical disk apparatus and the host in recording user data in a case where the remaining part of the management data area is small, there is no remaining part in the management data duplication area, and the management area cannot be extended;

FIG. 6 is a diagram to help explain the operation of the optical disk apparatus and the host in checking the state of the disk;

FIGS. 9A, 9B, 9C, 9D and 9E are diagrams to help explain a method of recording data onto a recordable optical disk which involves the extension of the management data area according to a second embodiment of the present invention;

FIG. 10 is a diagram to help explain a normal operation of the optical disk apparatus and the host in test recording;

FIG. 11 is a diagram to help explain the operation of the optical disk apparatus and the host in test recording in a case where the remaining part of the test zone is small and the test zone is extended;

FIG. 12 is a diagram to help explain the operation of the optical disk apparatus and the host in test recording in a case where the remaining part of the test zone is small, but the test zone cannot be extended;

DETAILED DESCRIPTION OF THE INVENTION

An embodiment of an optical disk, an optical disk recording method, and an optical disk apparatus according to the present invention will now be described with reference to the accompanying drawings.

Figure 1:
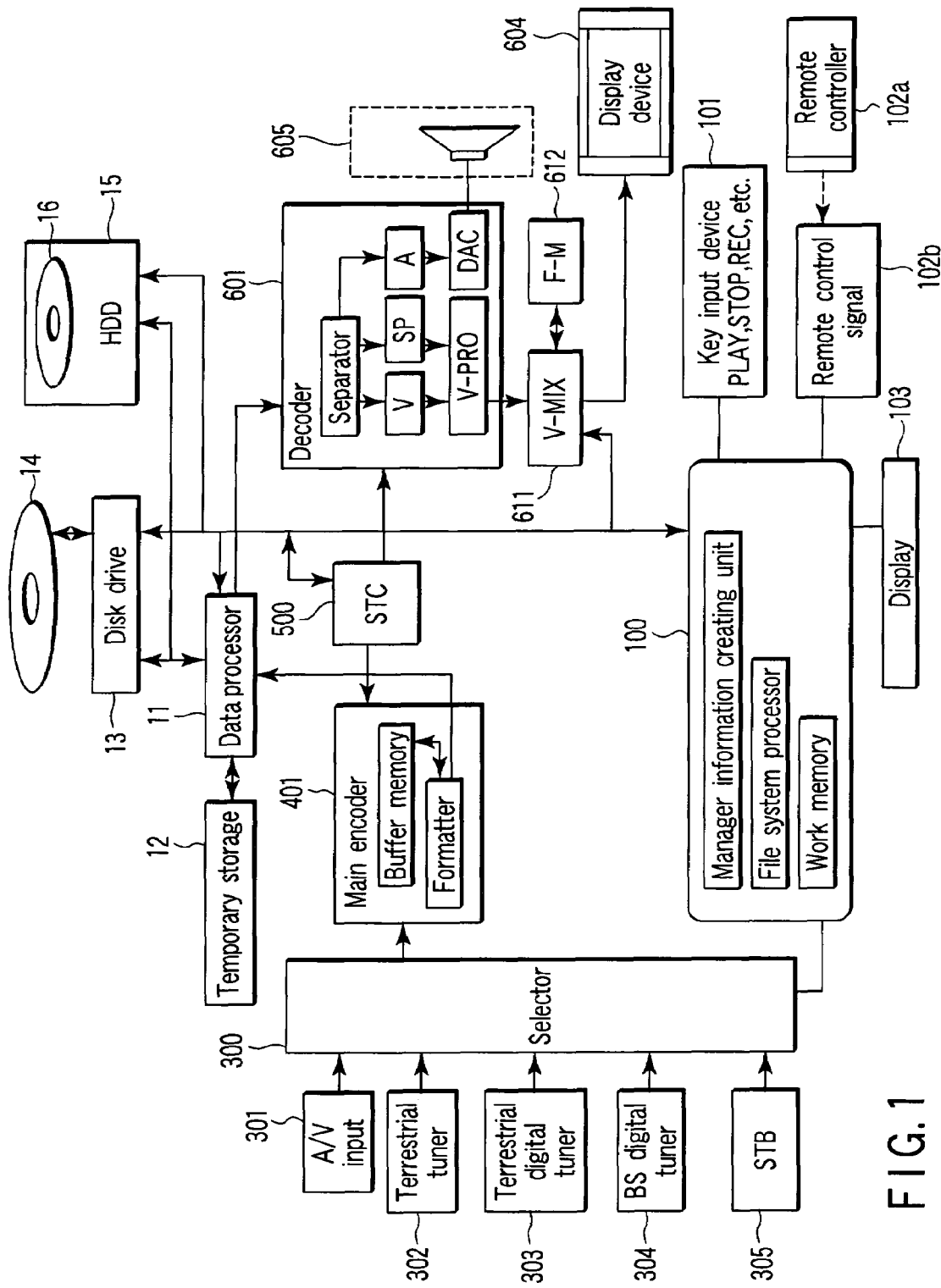
FIG. 1 is a block diagram of an optical disk apparatus according to an embodiment of the present invention.

FIG. 1 is a block diagram of an apparatus for recording and reproducing audio visual (AV) data (such as digital TV broadcasting program) onto an optical disk using a data structure related to an embodiment of the present invention. Since the present invention is related to recording, a detailed explanation of the part related to reproduction will be omitted.

This apparatus comprises a micro processing unit (MPU) 100, a key input device 101, a remote control signal receiver 102b which receives user operation data from a remote controller 102a, and a display 103.

An audio video input 301, an analog terrestrial tuner 302, a terrestrial digital tuner 303, a BS digital tuner 304, and a set-top box (STB) 305 can input respective signals to a selector 300. The set-top box 305, which is connected to a satellite antenna (not shown), decodes the received digital broadcasting data to produce an AV signal (digital) and outputs the AV signal.

The selector 300 selects a stream to be input and supplies the stream to a main encoder 401. The main encoder 401 converts the input signal into a specific format (for example, a format complying with the DVD specifications or the like) and supplies the resulting signal to a data processor 11.

The main encoder 401 includes an A/D converter, a video encoder, an input switch selector for the video encoder, an audio encoder, a sub-picture (SP) encoder, a formatter, and a buffer memory. The analog signal input from the terrestrial tuner 302 or a line input is converted digitally at the A/D converter. The digital signal is input to each encoder. The video signal is supplied to the video encoder. The audio signal is supplied to the audio encoder. Character data, for example, in teletext is supplied to the SP encoder (not shown), which subjects a video signal to MPEG compression, an audio signal to AC3 compression or MPEG audio compression, and character data to run length compression.

Each of the encoders divides the compressed data into blocks in such a manner that each of the blocks contains 2048 bytes. The blocks are input to the formatter. The formatter divides each packet into blocks, multiplexes the blocks, and sends the resulting signal to the data processor 11.

The data processor 11 creates an ECC block for every 16 (or 32) data blocks in the recording data with error correction code, performs a specific modulation, and sends the resulting signal to a disk drive 13 or a hard disk drive 15. The hard disk drive 15 is not necessarily needed. Use of the hard disk drive 15 enables temporarily recorded data to be stored on an optical disk 14 permanently.

In this situation, for example, when the disk drive 13 is in the busy state because it is seeking or making a track jump, a temporary storage 12 is used and the disk drive 13 is waited for to be ready. Under the control of the MPU 100, the data processor 11 can send the recording data to the disk drive 13 and the hard disk drive (HDD) 15 in recording data units (for example, in CDA units, physical continuous recording units) in a time-division manner.

The main encoder 401, which includes the formatter, not only sends the preceding recording data to the data processor 11 but also creates each piece of segmenting data during recording and sends them to the MPU 100 periodically (such as GOP head interrupt). To create data about video objects explained later, the segmenting data includes the number of logical blocks (LBs) in the VOBU, the end address of an I picture from the start of the VOBU, and the reproducing time of VOBU.

A system time counter (STC) 500, which is configured to make a clock count using 27 MHz, creates a reference clock for the block in each section of the apparatus.

Numeral 601 indicates a decoder. In reproduction, the data read from the optical disk 14 or hard disk 16 is amplified and subjected to error correction. The resulting data is sent to the decoder 601. The decoder 601 includes a separator containing a memory, a video decoder containing a reduced image (such as thumbnails) creating section, a sub-picture (SP) decoder, an audio decoder, a video processor (V-PRO), and an audio D/A converter.

The analog output (monaural, stereo, or AAC 5.1 CH surround) from the D/A converter is amplified by an AV amplifier or the like (not shown). The amplified signal is input to a speaker 605. The speaker 605 drives as many speakers as needed.

The stream data to be recorded is sent not only to the data processor 11 but also to the decoder 601 to display the content now being recorded on the display 604, such as a television monitor, which enables the content to be reproduced. In this case, the MPU 100 performs reproduction setting in the decoder 601. Thereafter, the decoder 601 carries out a reproducing process automatically.

In addition, the MPU 100 can multiplex character signals or symbol signals (e.g., an on-screen display signal) with the output video signal of the decoder 601. In the multiplexing process, a video mixer 611, a frame memory, and the like are used.

FIGS. 2A to 2E show the way data is recorded onto a recordable optical disk of the embodiment. Once data is recorded onto a recordable optical disk, the recorded part cannot be rewritten. As shown in FIGS. 2A to 2E, the optical disk includes a Control Data Zone (CDZ), an Inner Test Zone (ITZ), an Inner Guard Zone (IGZ), a Recording Management Data (RMD) duplication zone, a Recording Management Zone (RMZ), a user data zone, an outer guard zone, and an outer test zone. The capacity of each zone is predetermined and cannot be changed. As described later, in the embodiment, an extended recording management zone for recording management data is newly set in the user data zone, thereby practically extending the capacity of the recording management zone. The control data zone is included in the system lead-in area. The inner test zone, inner guard zone, recording management data duplication zone, and recording management zone are included in the data lead-in area. The outer guard zone and outer test zone are included in the data lead-out area.

On the optical disk, control data indicating the type of the optical disk (read only disk, recordable disk, or rewritable disk) and the like has been recorded in the initial state (FIG. 2A).

When data is recorded onto the optical disk (assuming that recording is performed from the inner periphery of the user data zone), test recording is first done in the inner test zone. Since even optical disks of the same type differ in characteristics from manufacturer to manufacturer or in the recording waveform according to the temperature in the use environment, the laser operating environment, or the like, the parameters (including intensity and pulse width) of the recording waveform in recording data onto the optical disk are adjusted on the basis of the result of the test recording (FIG. 2B). When user data is recorded on the outer periphery of the user data zone, test recording is performed in the outer test zone.

Thereafter, the management data and the user data are recorded in the recording management zone and the user data zone, respectively (FIG. 2C). The recording management data includes information indicating which part of the user data zone has been recorded into (or how much the user data zone has been recorded into). In recording data, the user data is recorded into the unrecorded part of the user data zone on the basis of the recording management data. Therefore, the management data is updated to the latest one according to how much user data has been recorded. Once data has been written onto the optical disk, the recorded part cannot be rewritten. Therefore, updating the management data involves additionally recording the latest management data, with the result that the remaining capacity of the recording management zone decreases each time updating is performed. Before the user data is recorded, the remaining capacity of the recording management zone is checked. If the remaining capacity is smaller than a specific value, the recording of the user data is interrupted (FIG. 2C).

After the recording is interrupted, an extended recording management zone to record management data is newly set (or secured) in (the outer periphery of the recorded part of) the user data zone (FIG. 2D). Data about the location in which the extended recording management zone has been secured is added to the management data, thereby updating the management data to the latest one. Specific data (for example, the latest management data) is recorded in the whole of the unrecorded part of the original recording management zone, thereby eliminating the unrecorded part of the original recording management zone. Then, the latest management data is recorded into the recording management data duplication zone. That is, only management data including information indicating the location of the extended recording management zone is recorded in the recording management data duplication zone.

Then, the management data and the user data are recorded in the extended recording management zone and the user data zone, respectively (FIG. 2E).

After the extended recording management zone has been secured, the remaining capacity of the extended recording management zone, not of the recording management zone, is checked before the recording of the user data commences. If the remaining capacity has decreased below a specific value, the recording of the user data is interrupted and the operation starting in FIG. 2D is repeated, thereby securing another extended recording management zone.

The reason why the latest management data is recorded in the recording management data duplication zone will be explained. As described above, to check for the recording start location, the latest management data has to be referred to. If there is only one recording management zone, the last management data is invariably the latest management data, which enables the latest management data to be referred to immediately. When there is an extended recording management zone or zones, the latest management data cannot be referred to unless the recording management zone and extended recording management zone or zones are searched one after another, since the number of extended recording management zones is unknown. To overcome this problem, the management data at the time when the recording management zone was extended is recorded in the recording management data duplication zone. Checking the latest management data in the recording management data duplication zone makes it possible to refer to (the latest management data in) the extended recording management zone in which the latest management data has been recorded.

Figure 3:
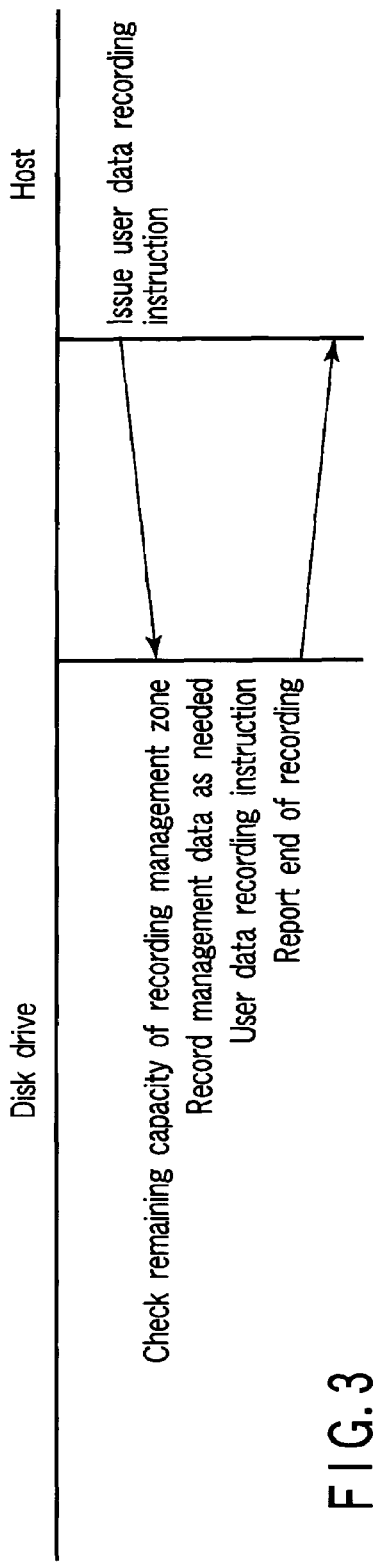
FIG. 3 is a diagram to help explain a normal operation of the optical disk apparatus and the host in recording user data.
Figure 4:
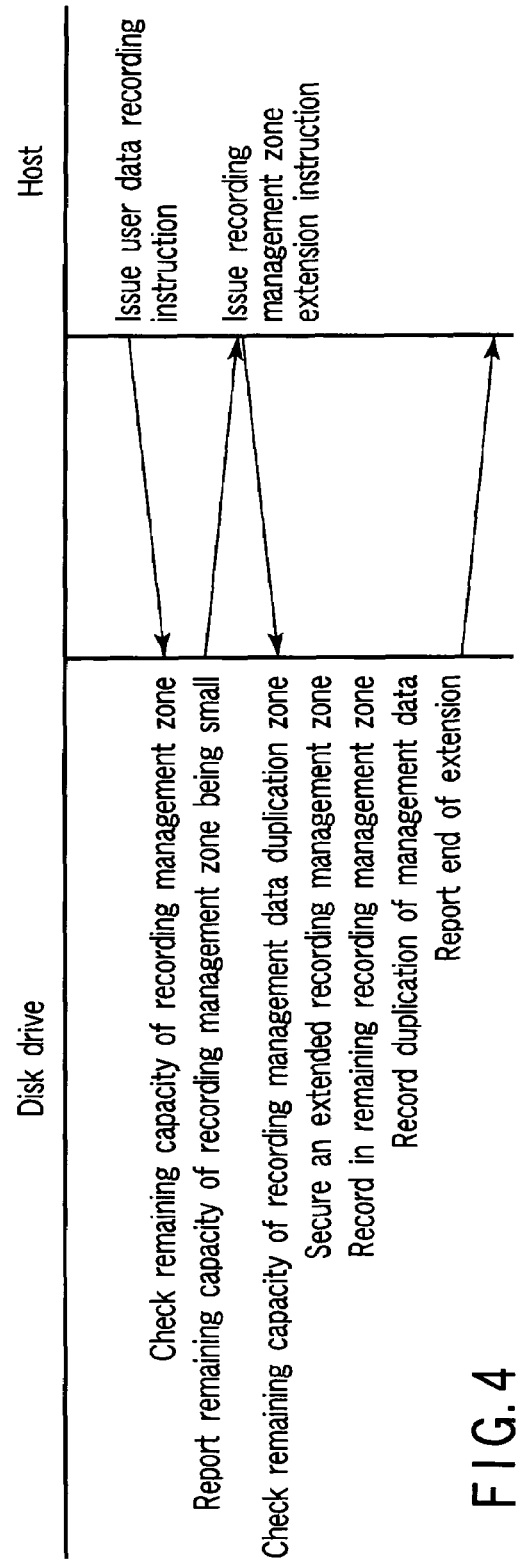
FIG. 4 is a diagram to help explain the operation of the optical disk apparatus and the host in recording user data in a case where the remaining part of the management data area is small and the management area is extended.

FIGS. 3 to 5 show examples of the operation of recording user data in the optical disk apparatus.

As shown in FIG. 3, when the host 100 transmits a user data recording instruction, the disk drive 13 checks for the remaining capacity of the recording management zone. If the remaining capacity is sufficient, the disk drive 13 updates the management data if necessary and then records the user data in the user data zone. After having finished recording, the disk drive 13 informs the host 100 of the completion of the recording.

If the remaining capacity of the recording management zone is small, the disk drive 13 informs the host 100 that the remaining capacity of the recording management zone is small as shown in FIG. 4. The host 100 transmits a recording management zone extension instruction to the disk drive 13. The disk drive 13 then checks for the remaining capacity of the recording management data duplication zone. If there is room in the recording management data duplication zone, the disk drive 13 secures an extended recording management zone in the user data zone and adds the location in which the extended recording management zone has been secured to the management data, thereby updating the management data to the latest one. In the user data zone in which the extended recording management zone has been set, user data is no longer recorded. Then, the latest management data is recorded not only in all of the remaining part of the recording management zone but also in the recording management data duplication zone. Thereafter, the disk drive 13 informs the host 100 that the extended recording management zone has been secured (or the recording management zone has been extended). After the extended recording management zone has been secured, the host 100 gives a user data recording instruction, the user data is recorded according to the procedure shown in FIG. 3.

If there is no room in the recording management data duplication zone, the disk drive 13 informs the host 100 that there is no room in the recording management data duplication zone as shown in FIG. 5.

In the embodiment, as shown in FIG. 6, the disk drive 13 has the function of, according to a disk state check instruction from the host 100, checking for the remaining capacity of the recording management zone (including the extended recording management zone) and that of the recording management data duplication zone and informing the host 100 of the result of the checking. For example, the function enables the host 100 to predict how much more user data can be recorded. The information responding to the disk state check instruction from the host 100 may include not only the remaining capacity of the recording management zone and that of the recording management data duplication zone but also another state.

Figure 7:
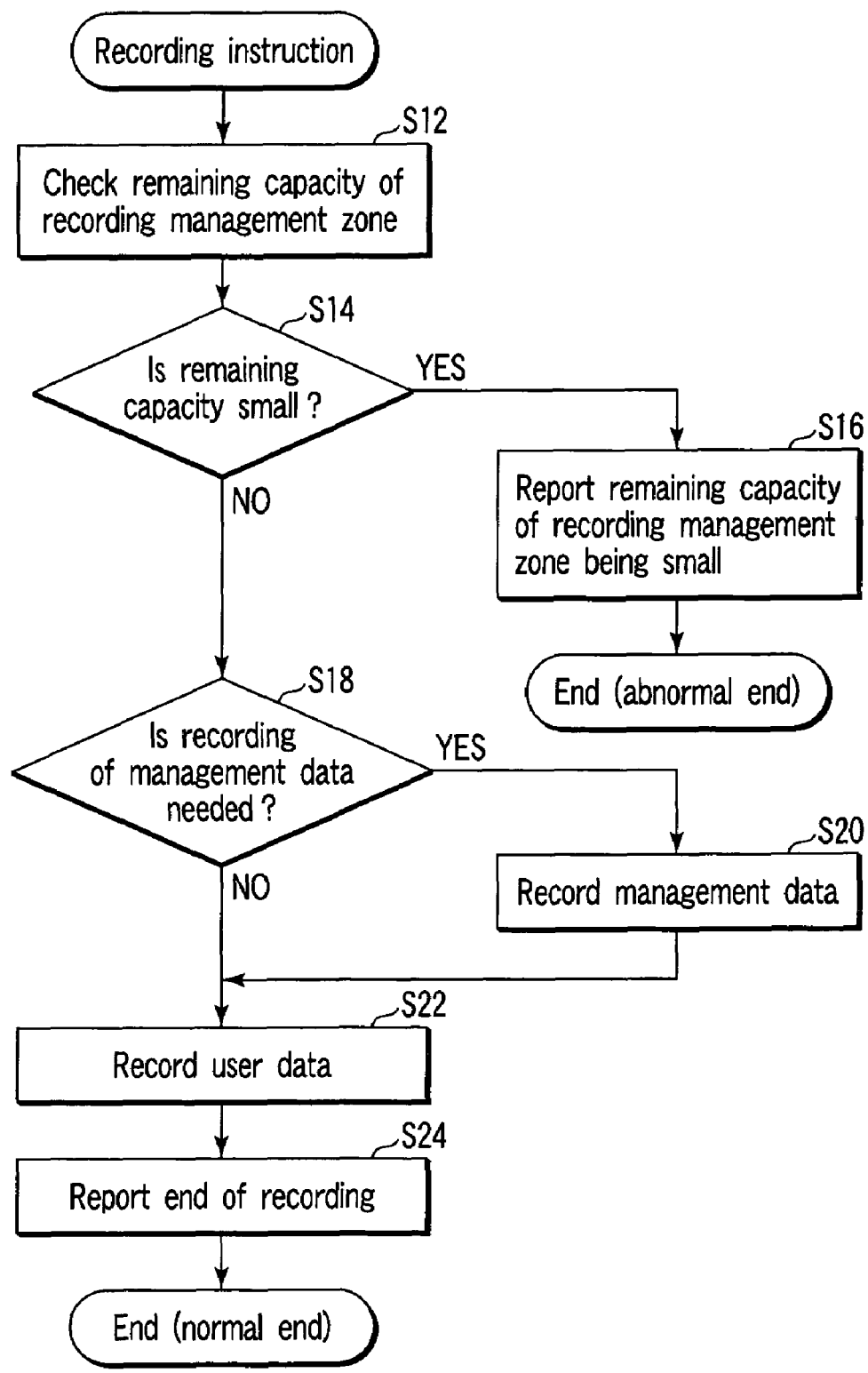
FIG. 7 is a flowchart to help explain the operation of the optical disk apparatus of the first embodiment when a user data recording instruction is issued.

FIG. 7 shows the operation flow of the disk drive 13 when the host 100 issues a user data recording instruction. The disk drive 13 first checks for the remaining capacity of the recording management zone (step S12). In step S14, the disk drive 13 determines whether the remaining capacity is smaller than a predetermined capacity. If the remaining capacity is smaller than the predetermine capacity, the disk drive 13, in step S16, informs the host 100 that the remaining capacity of the recording management zone is small and does not carry out a recording operation and ends the operation (abnormally).

If the remaining capacity of the recording management zone is not smaller than the predetermine capacity, the disk drive 13, in step S18, determines whether the update of the management data is needed. If the update of the management data is needed, the management data is updated in step S20. After the management data has been updated, or when the update of the management data is not needed, the disk drive 13 records the user data and, in step S24, informs the host 100 that the recording is completed, which completes the recording operation properly. The management data is often not updated each time a recording instruction is issued. For example, when many small-size files are recorded onto an optical disk, a recording instruction is issued each time a file is recorded. Therefore, if the management data is updated each time a recording instruction is issued, the capacity of the recording management zone soon runs short. To avoid this problem, according to the DVD-R specifications, management data is to be updated only when the last recording location actually recorded is separated 16 megabytes or more away from the last recording location specified in the management data.

Figure 8:
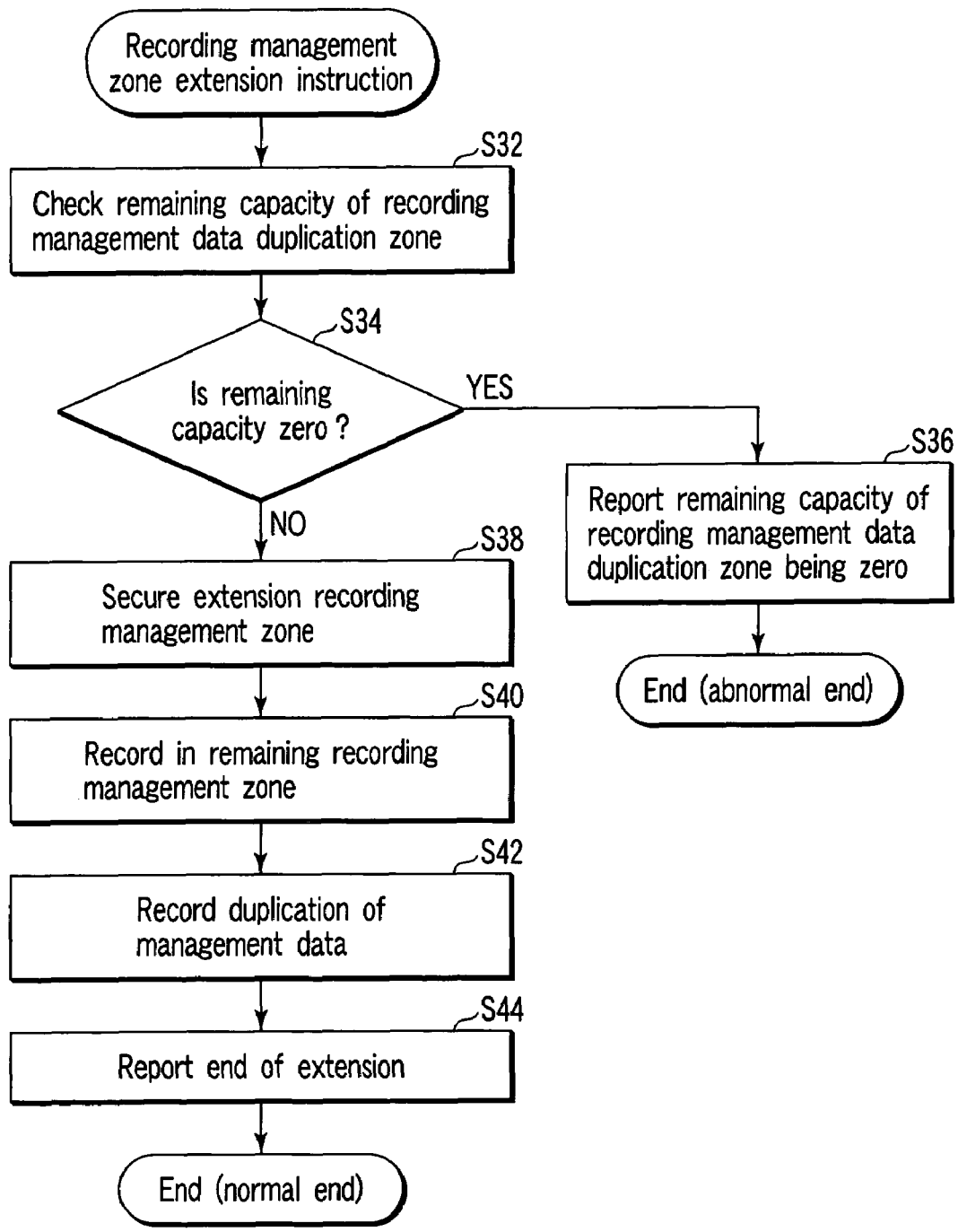
FIG. 8 is a flowchart to help explain the operation of the optical disk apparatus of the first embodiment when a management data area extension instruction is issued.

FIG. 8 shows the operation flow of the disk drive 13 when the host 100 issues a recording management zone extension instruction. Normally, the host 100 issues a recording management zone extension instruction when, in step S16, being informed that the remaining capacity of the recording management zone is small. The issuing timing of the recording management zone extension instruction is not limited to this. The instruction may be issued with arbitrary timing.

The disk drive 13 first checks the remaining capacity of the recording management data duplication zone (step S32). In step S34, the disk drive 13 determines whether the remaining capacity is smaller than a predetermined capacity. If the remaining capacity is smaller than the predetermined capacity, the disk drive 13, in step S36, informs the host 100 that the remaining capacity of the recording management data duplication zone is zero and does not expand the recording management zone, which the operation (abnormally).

If the remaining capacity of the recording management data duplication zone is large, the disk drive 13, in step S38, secures an extended recording management zone and adds the location in which the extended recording management zone has been secured to the management data. In step S40, the disk drive 13 records the latest management data in the remaining part of the recording management zone. In step S42, the disk drive 13 records the latest management data in the recording management data duplication zone. In step S44, the disk drive 13 informs the host 100 that the extension has been completed, which ends the extension of the recording management zone.

After the recording management zone has been extended, the recording management zone in the flow chart means the extended recording management zone.

As described above, the embodiment has solved the problem of the conventional recordable DVD which cannot record a part of the user data to be recorded because of shortage of the capacity of the recording management zone. In addition, since the recording management zone is secured sufficiently, the problem of the capacity of the user data zone running short will not arise.

Hereinafter, a second embodiment of the present invention will be explained. In the second embodiment, the same portions as those in the first embodiment are indicated by the same reference numerals and a detailed explanation of them will be omitted.

Since the block diagram of an optical disk apparatus of the second embodiment is the same as that of the first embodiment, it will not be shown.

FIGS. 9A to 9E show the way data is recorded onto a recordable optical disk of the second embodiment. The structure of the disk is the same as that of the first embodiment shown in FIGS. 2A to 2E. The capacity of each of the zones is predetermined and cannot be changed. However, as described later, in the second embodiment, the capacity of the test zone where test recording is performed is substantially extended by setting all of or a part of the guard zone (e.g., the outer guard zone) or all of the guard zone and a part of the user data zone as an extended test zone where test recording is performed and by setting the extended test zone or a part of the user data zone contacting the guard zone as a new guard zone.

On the optical disk, control data indicating the type of the optical disk (read only disk, recordable disk, or rewritable disk) and the like has been recorded in the initial state (FIG. 9A).

When data is recorded onto the optical disk (assuming that recording is performed from the inner periphery of the user data zone), test recording is first done in the inner test zone. Since even optical disks of the same type differ in characteristics from manufacturer to manufacturer or in the recording waveform according to the temperature in the use environment, the laser operating environment, or the like, the parameters (including intensity and pulse width) of the recording waveform in recording data onto the optical disk are adjusted on the basis of the result of the test recording (FIG. 9B). When user data is recorded onto the outer periphery of the user data zone, test recording is performed in the outer test zone.

Thereafter, the management data and the user data are recorded in the recording management zone and the user data zone, respectively (FIG. 9C). The management data includes data indicating which part of the user data zone has been recorded into (or how much the user data zone has been recorded into). In recording data, the user data is recorded into the unrecorded part of the user data zone on the basis of the management data.

As described above, once data has been recorded onto the recordable optical disk, the recorded part cannot be rewritten. Therefore, each time test recording is performed, the remaining capacity of the test zone decreases. Before test recording is performed, the remaining capacity of the test zone is checked. If the remaining capacity is smaller than a specific value, the test recording is interrupted (FIG. 9C). In the second embodiment, (a part of or all of) the outer guard zone can be used as an extended test zone for test recording as needed. When the original outer guard zone is used as an extended test zone, an area internally touching the extended test zone becomes a new outer guard zone (FIGS. 9D and 9E).

FIGS. 10 to 12 show examples of test recording operations of the optical disk apparatus.

As shown in FIG. 10, when the host 100 issues a test recording instruction, the disk drive 13 checks the remaining capacity of the test zone. If the remaining capacity is sufficient, the disk drive 13 performs test recording and updates the management data. Thereafter, the disk drive 13 informs the host 100 of the completion of the test recording.

If the remaining capacity of the test zone is small, the disk drive 13 informs the host 100 that the remaining capacity of the test zone is small as shown in FIG. 11. The host 100 transmits a test zone extension instruction to the disk drive 13. The disk drive 13 checks whether the test zone can be extended. How many times the test zone can be extended is predetermined. How many times the test zone has been extended can be known, by referring to the management data. Whether the test zone can be extended is determined by reading the number of times the test zone was extended recorded in the management data. In the second embodiment, the number of times the test zone can be extended is one. The reason for this is to facilitate management and prevent the amount of data to be written in the management data from growing larger.

If the test zone can be extended, the disk drive 13 secures an extended test zone. Specifically, (all of or a part of) the outer guard zone is allocated to an extended test zone and the user data zone internally contacting the extended test zone is newly allocated to the outer guard zone. The disk drive 13 records, in the recording management zone, management data indicating that a test zone including an inner test zone, an outer test zone, and an extended test zone has been newly allocated and that the user data zone has decreased. Then, the disk drive 13 informs the host 100 that the extension of the test zone is completed.

The extension of the test zone is not limited to when the remaining capacity of the test zone has become small. Even when the remaining capacity of the test zone is sufficient, the test zone can be extended according to an instruction issued from the host 100.

If the test zone cannot be extended, the disk drive 13 informs the host 100 that the test zone cannot be extended as shown in FIG. 12.

Figure 13:
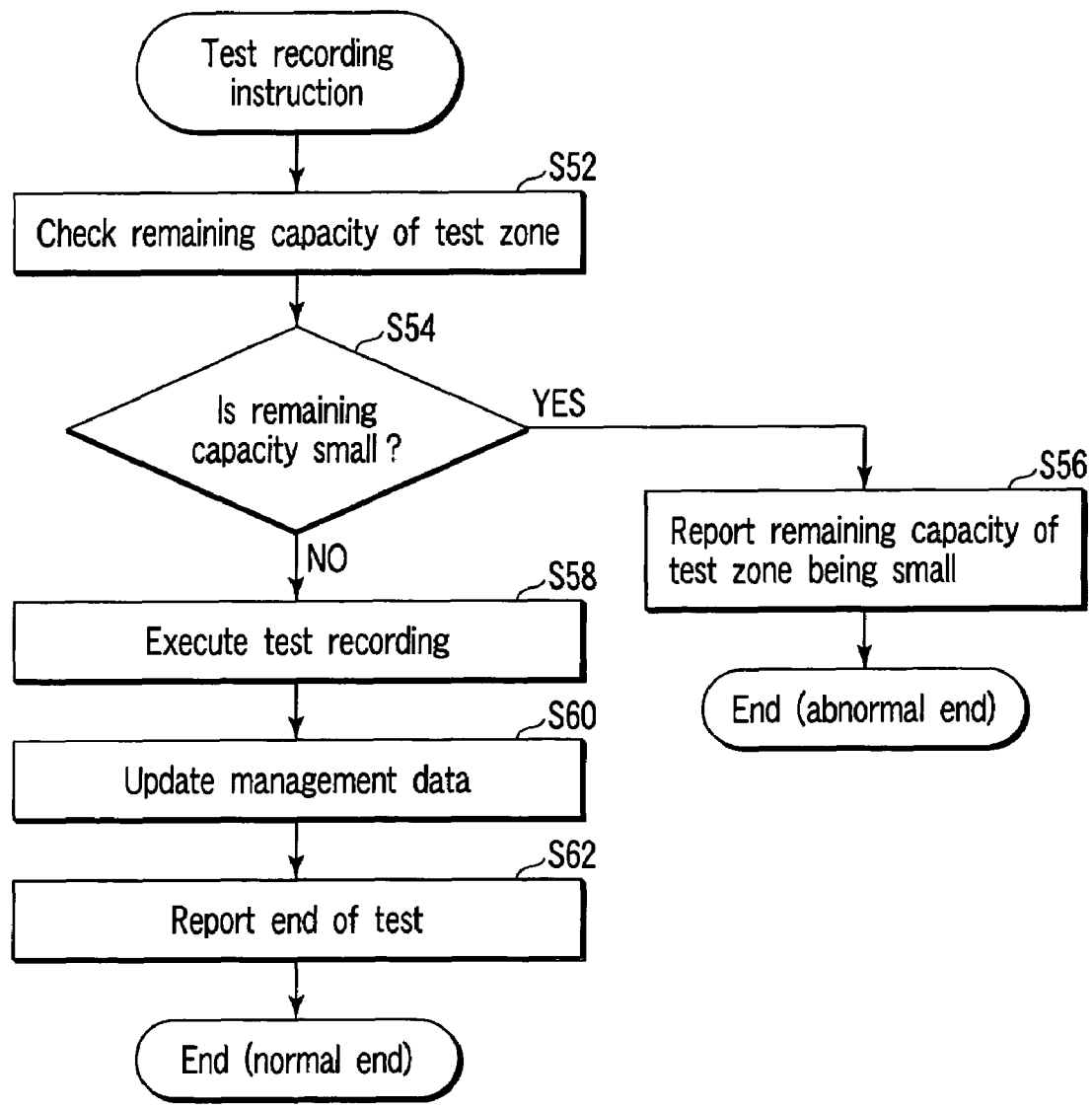
FIG. 13 is a flowchart to help explain the operation of the optical disk apparatus of the second embodiment when a test recording instruction is issued.

FIG. 13 shows the operation flow of the disk drive 13 when the host 100 issues a test recording instruction. The disk drive 13 first checks the remaining capacity of the test zone (step S52). In step S54, the disk drive 13 determines whether the remaining capacity is smaller than a predetermined capacity. If the remaining capacity is smaller than the predetermined capacity, the disk drive 13 informs the host 100 that the remaining capacity of the test zone is small (step S54) and does not carry out a test recording operation, which ends the operation (abnormally).

If the remaining capacity of the test zone is large, the disk drive 13 performs test recording in step S58. In step S60, the disk drive 13 records, in the recording management zone, management data indicating which part of the test zone has been used (or updates the management data). Finally, in step S62, the disk drive 13 informs the host 100 that the test recording has been completed, which completes the test recording operation properly.

Figure 14:
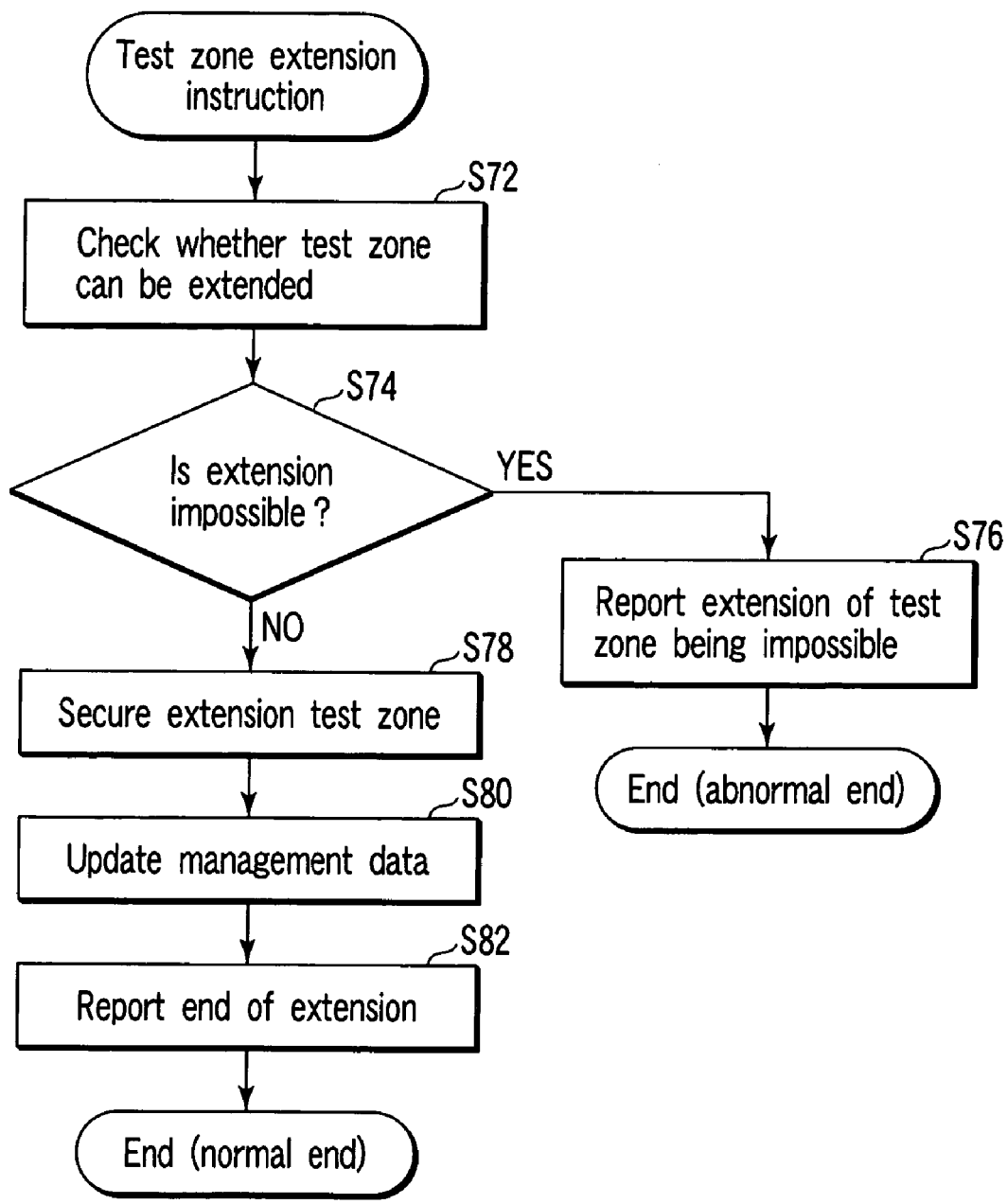
FIG. 14 is a flowchart to help explain the operation of the optical disk apparatus of the second embodiment when a test zone extension instruction is issued.

FIG. 14 shows the operation flow of the disk drive 13 when the host 100 issues a test zone extension instruction. The disk drive 13 first determines whether the test zone can be extended (step S72). If the test zone cannot be extended (Yes in step S74), the disk drive 13 informs the host 100 that the test zone cannot be extended (step S76), which results in an abnormal end of the test zone extension operation. If the test zone can be extended (No in step S74), the disk drive 13 secures an extended test zone in step S78 and records management data related to the extension into the recording management zone in step S80. Finally, in step S82, the disk drive 13 informs the host 100 that the extension operation is completed, which completes the test zone extension operation.

As described above, the second embodiment has solved the problems of the conventional recordable DVD: the user data cannot be recorded, since test recording to find the best recording waveform cannot be performed because of shortage of the capacity of the test zone, or the user data cannot be reproduced with sufficiently high reliability even if the user data can be recorded. In addition, since the test zone is secured sufficiently, the capacity of the user data zone does not run short.

The present invention is not limited to the above embodiments and may be practiced or embodied in still other ways without departing from the spirit or essential character thereof. For instance, while in FIG. 9, the extended test zone coincides with the outer guard zone, a part of the outer guard zone or all of the outer guard zone and a part of (the unrecorded part of) the outer test zone may be used as an extended test zone. In each of the cases, the user data zone contacting the extended test zone becomes a new outer test zone.

Furthermore, various inventions can be realized by combining a plurality of component elements disclosed in the above embodiments. For instance, while in the first and second embodiments, the recording management zone and the test zone have been extended, respectively, the first and second embodiments may be combined to realize a new embodiment. In this embodiment, before test recording or user data recording is performed, the remaining capacity of the test zone or that of the recording management zone is checked and, if the remaining capacity is small, the test zone or the recording management zone is extended.

What is claimed is:

1. An optical disk recording method of recording data onto a recordable optical disk which includes a data zone where data is recorded, a test zone where a test recording is performed, and a guard zone provided between the data zone and the test zone, the optical disk recording method comprising:
    setting all of or a part of the guard zone or all of the guard zone and a part of the data zone as an extended test zone where the test recording is performed in response to an extension instruction;
    setting the extended test zone or a part of the data zone contacting the guard zone as a new guard zone;
    checking the number of times the test zone is extended to determine whether the number of times is smaller than a predetermined number in response to the extension instruction; and
    transmitting a result of the determination in the checking step to a host which issues the extension instruction.

2. The optical disk recording method according to claim 1, further comprising:
    checking a capacity of an unrecorded test zone to determine whether the capacity of the unrecorded test zone is smaller than a predetermined capacity; and
    transmitting a result of the determination in the checking step to a host which issues the extension instruction.

3. The optical disk recording method according to claim 1, wherein the checking, in response to a data recording instruction from the host, checks the capacity of the unrecorded test zone before recording data.

4. The optical disk recording method according to claim 1, further comprising recording the number of times the test zone is extended as management data in the management data zone.

5. An optical disk recording apparatus which records data onto a recordable optical disk which includes a data zone where data is recorded, a test zone where a test recording is performed, and a guard zone provided between the data zone and the test zone, the optical disk recording apparatus comprising:
    a first setting unit which sets all of or a part of the guard zone or all of the guard zone and a part of the data zone as an extended test zone where the test recording is performed in response to an extension instruction;
    a second setting unit which sets the extended test zone or a part of the data zone contacting the guard zone as a new guard zone;
    a checking unit which checks the number of times the test zone is extended to determine whether the number of times is smaller than a predetermined number in response to the extension instruction; and
    a transmitting unit which transmits a result of the determination in the checking unit to a host which issues the extension instruction.

6. The optical disk recording apparatus according to claim 5, further comprising:
    a checking unit which checks a capacity of an unrecorded test zone to determine whether the capacity of the unrecorded test zone is smaller than a predetermined capacity; and
    a transmitting unit which transmits a result of the determination in the checking unit to a host which issues the extension instruction.

7. The optical disk recording apparatus according to claim 6, wherein the checking unit, in response to a data recording instruction from the host, checks the capacity of the unrecorded test zone before recording data.

8. The optical disk recording apparatus according to claim 5, further comprising a recording unit records the number of times the test zone is extended as management data in the management data zone.

* * * * *